US012749777B2

(12) United States Patent
Jung

(10) Patent No.: US 12,749,777 B2
(45) Date of Patent: Sep. 29, 2026

(54) SECONDARY BATTERY

(71) Applicant: Samsung SDI Co., Ltd., Yongin-si (KR)

(72) Inventor: Hyun Ki Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 662 days.

(21) Appl. No.: 18/099,180

(22) Filed: Jan. 19, 2023

(65) Prior Publication Data

US 2023/0231284 A1 Jul. 20, 2023

(30) Foreign Application Priority Data

Jan. 20, 2022 (KR) ........................ 10-2022-0008442

(51) Int. Cl.

*H01M 50/533* (2021.01)
*H01M 50/107* (2021.01)
*H01M 50/179* (2021.01)
*H01M 50/536* (2021.01)
*H01M 50/566* (2021.01)

(52) U.S. Cl.

CPC ....... *H01M 50/533* (2021.01); *H01M 50/107* (2021.01); *H01M 50/179* (2021.01); *H01M 50/536* (2021.01); *H01M 50/566* (2021.01)

(58) Field of Classification Search

CPC ............. H01M 50/533; H01M 50/107; H01M 50/536; H01M 50/566

See application file for complete search history.

(56) References Cited

U.S. PATENT DOCUMENTS

| | | | | |
|---|---|---|---|---|
| 7,335,442 | B2 | 2/2008 | Nakanishi et al. | |
| 8,147,999 | B2 | 4/2012 | Wu | |
| 8,557,430 | B2 | 10/2013 | Byun et al. | |
| 9,136,538 | B2 | 9/2015 | Byun et al. | |
| 9,496,557 | B2 | 11/2016 | Fuhr et al. | |
| 11,296,388 | B2 | 4/2022 | Fukuda et al. | |
| 2004/0023107 | A1* | 2/2004 | Nakanishi | H01M 50/566 429/211 |
| 2008/0166630 | A1 | 7/2008 | Okabe et al. | |
| 2009/0311583 | A1 | 12/2009 | Wu | |
| 2010/0216001 | A1* | 8/2010 | Byun | H01M 50/538 429/185 |
| 2012/0151754 | A1 | 6/2012 | Wu | |

(Continued)

FOREIGN PATENT DOCUMENTS

| | | |
|---|---|---|
| CN | 102057516 A | 5/2011 |
| CN | 203386613 U | 1/2014 |

(Continued)

OTHER PUBLICATIONS

JP 2001256954 MT (Year: 2001).*

(Continued)

*Primary Examiner* — Alexander Usyatinsky

(74) *Attorney, Agent, or Firm* — Womble Bond Dickinson (US) LLP

(57) ABSTRACT

A secondary battery includes: an electrode assembly; a case accommodating the electrode assembly; a cap plate sealing the case; and a current collector plate welded between the electrode assembly and the case or between the electrode assembly and the cap plate. The current collector plate has a slit therein.

18 Claims, 4 Drawing Sheets

(56) References Cited

U.S. PATENT DOCUMENTS

| | | | | |
|---|---|---|---|---|
| 2014/0017565 | A1 | 1/2014 | Byun et al. | |
| 2015/0236369 | A1* | 8/2015 | Takatsuka | H01M 50/533 429/94 |
| 2019/0379019 | A1 | 12/2019 | Fukuda et al. | |
| 2023/0006291 | A1 | 1/2023 | Park et al. | |

FOREIGN PATENT DOCUMENTS

| | | | | |
|---|---|---|---|---|
| CN | 110581235 | A | | 12/2019 |
| CN | 113346201 | A | | 9/2021 |
| CN | 113540624 | A | | 10/2021 |
| CN | 115548590 | A | | 12/2022 |
| EP | 0 921 581 | A1 | | 6/1999 |
| EP | 4 117 096 | A1 | | 1/2023 |
| JP | H 02 148565 | A | | 6/1990 |
| JP | 2001-256954 | A | | 9/2001 |
| JP | 2001256954 | | * | 9/2001 |
| JP | 2002170543 | A | * | 6/2002 |
| JP | 3960877 | B2 | | 8/2007 |
| JP | 4524982 | B2 | | 8/2010 |
| JP | 5348968 | B2 | | 11/2013 |
| KR | 10-1023865 | B1 | | 3/2011 |
| KR | 10-2021-0085717 | A | | 1/2023 |

OTHER PUBLICATIONS

JP-2002170543 Mt (Year: 2002).*

Decision of KPO to grant a Patent for KR 1020220008442 (Year: 2025).*

The decision of KPO to grant a Patent for Application KR 20220008442 (Year: 2025).*

Extended European Search Report issued in corresponding EP Application No. 23152651.8, dated Jun. 22, 2023, 10 pages.

Korean Office Action issued in corresponding KR Application No. 10-2022-0008442, dated May 8, 2024, 5 pages.

* cited by examiner

SECONDARY BATTERY

CROSS-REFERENCE TO RELATED APPLICATION

This application claims priority to and the benefit of Korean Patent Application No. 10-2022-0008442, filed on Jan. 20, 2022, in the Korean Intellectual Property Office, the entire disclosure of which is incorporated herein by reference.

BACKGROUND

1. Field

Aspects of embodiments of the present disclosure relate to a secondary battery.

2. Description of the Related Art

Lithium-ion secondary batteries are used as power sources for portable electronic devices as well as hybrid vehicles or electric vehicles because of, for example, their high operating voltage and high energy density per unit weight.

Such secondary batteries may be classified into cylindrical, prismatic, or pouch type secondary batteries according to their shape. A cylindrical secondary battery generally includes a cylindrical electrode assembly, a cylindrical can to which the electrode assembly is coupled, an electrolyte injected into the inside of the can to enable the movement of lithium ions, and a cap assembly coupled to one side of the can to prevent leakage of the electrolyte and to prevent separation of the electrode assembly from the can.

The above information disclosed in this Background section is for enhancement of understanding of the background of the present disclosure, and therefore, it may contain information that does not constitute prior art.

SUMMARY

An embodiment of the present disclosure provides a secondary battery that can prevent separation of a welding region between an electrode assembly and a current collector plate or separation of a welding region between a current collector plate and a can when it is subjected to vibration or impact.

A secondary battery, according to an embodiment of the present disclosure, includes: an electrode assembly; a case accommodating the electrode assembly; a cap plate sealing the case; and a current collector plate welded between the electrode assembly and the case or between the electrode assembly and the cap plate. The current collector plate has a slit therein.

The slit may be C-shaped or U-shaped.

The current collector plate may have a disc-shaped body and an electrode welding portion partitioned inside the body by the slit and welded to the electrode assembly.

The electrode welding portion may be separated from a central region of the body of the current collector plate by the slit.

A periphery of the body and the electrode welding portion may be maintained at a connected state.

The electrode assembly may be welded to the electrode welding portion partitioned by the slit.

The current collector plate may have a plurality of the slits, and the slits may be arranged at an angle with respect to a center of the current collector plate.

The current collector plate may have an even number of the slits, and the slits may be symmetrically arranged with respect to the center of the current collector plate.

The secondary battery may further include a first terminal. The case may have an opening sized to accommodate the electrode assembly, the case may have a hole in a surface facing the opening, and the first terminal may be electrically coupled to the current collector plate through the hole in the case.

The first terminal may have a head part outside the case and a fastening part welded and coupled to a central region of the current collector plate through the hole in the case.

DETAILED DESCRIPTION

Figure 1:
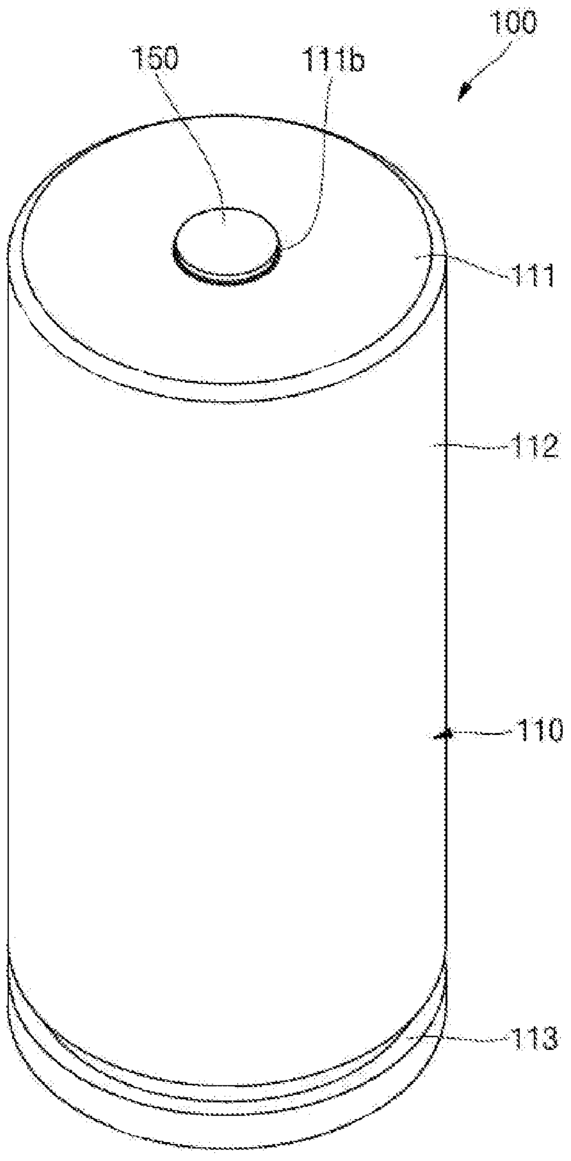
FIG. 1 is a perspective view illustrating a cylindrical secondary battery according to an embodiment of the present disclosure.

Hereinafter, embodiments of the present disclosure will be described in detail with reference to the accompanying drawings.

Embodiments of the present disclosure are provided to more fully describe the present disclosure to those skilled in the art, and the following embodiments may be embodied in many different forms, and the present disclosure should not be understood as being limited to the embodiments set forth herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
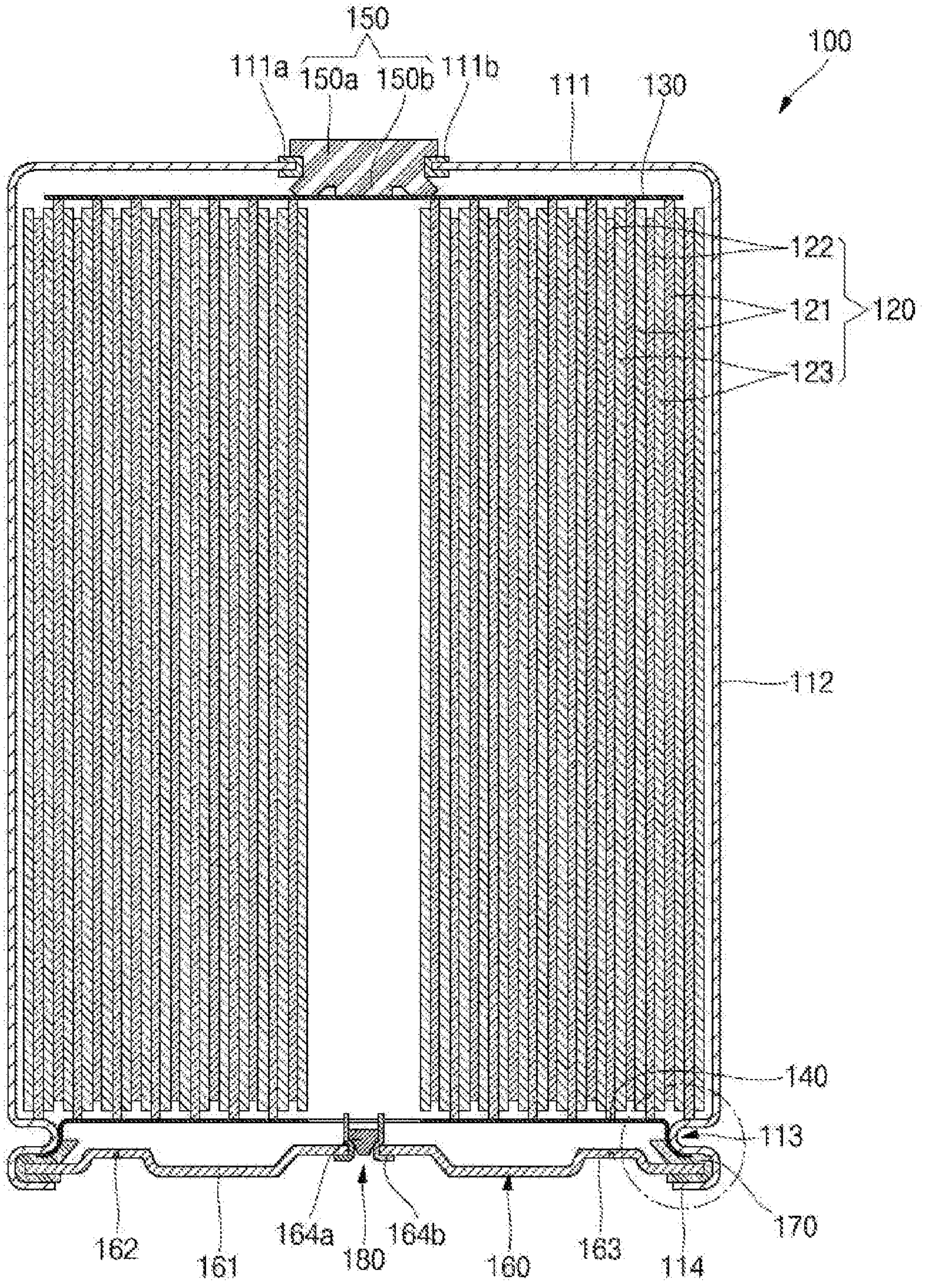
FIG. 2 is a cross-sectional view of the cylindrical secondary battery shown in FIG. 1.
Figure 3:
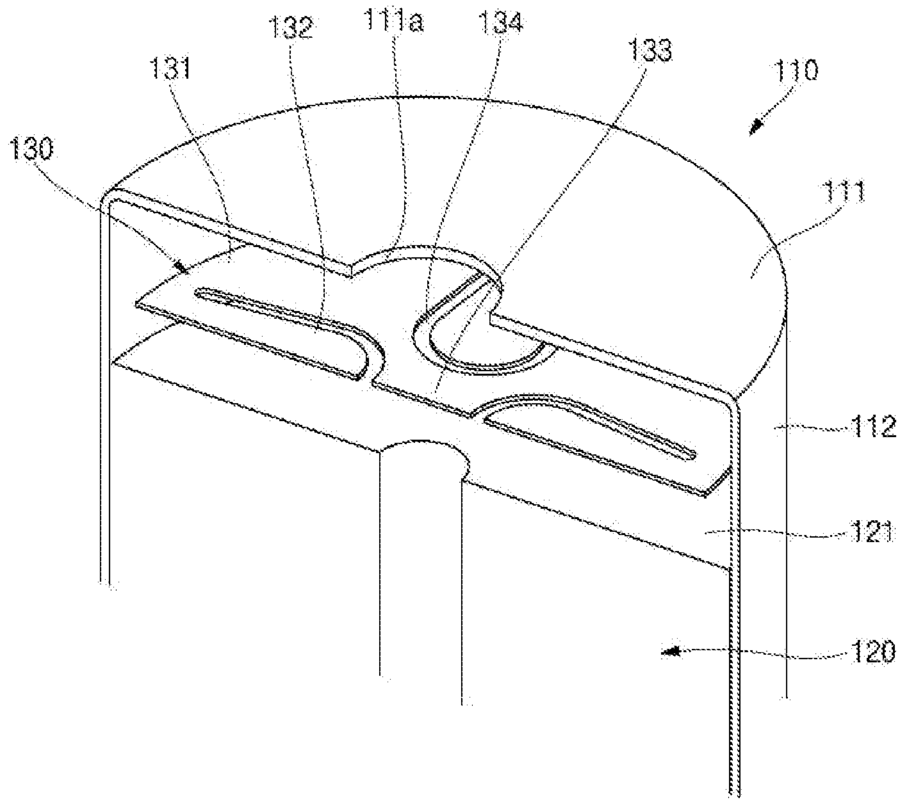
FIG. 3 is a cut-away perspective view illustrating a portion of a secondary battery according to an embodiment of the present disclosure.
Figure 4A:
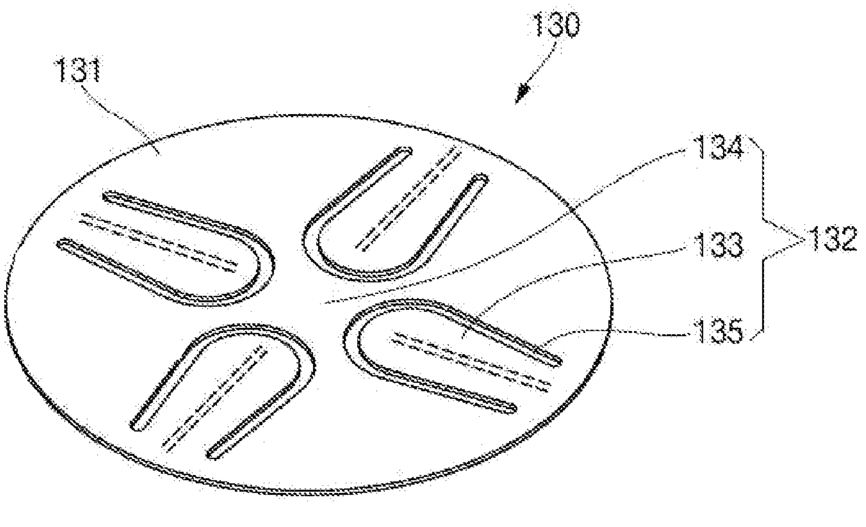
FIGS. 4A and 4B are perspective views illustrating a welding region and a stress direction of a current collector plate in a secondary battery according to an embodiment of the present disclosure.
Figure 4B:
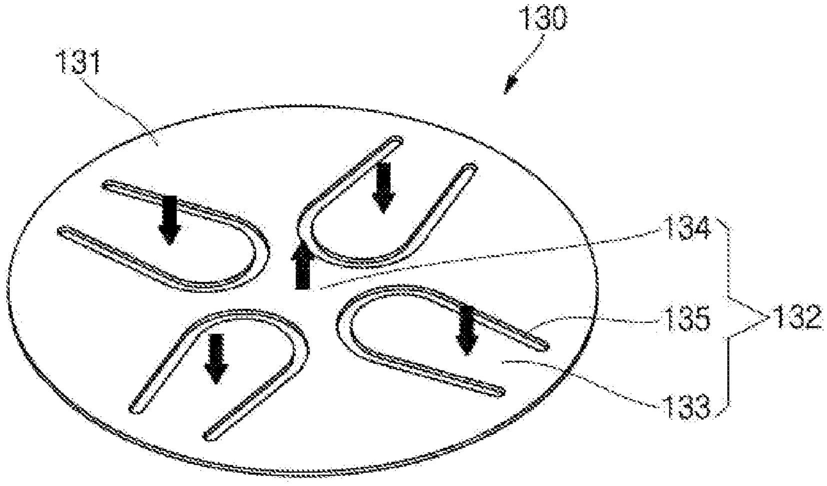
Figure 5:
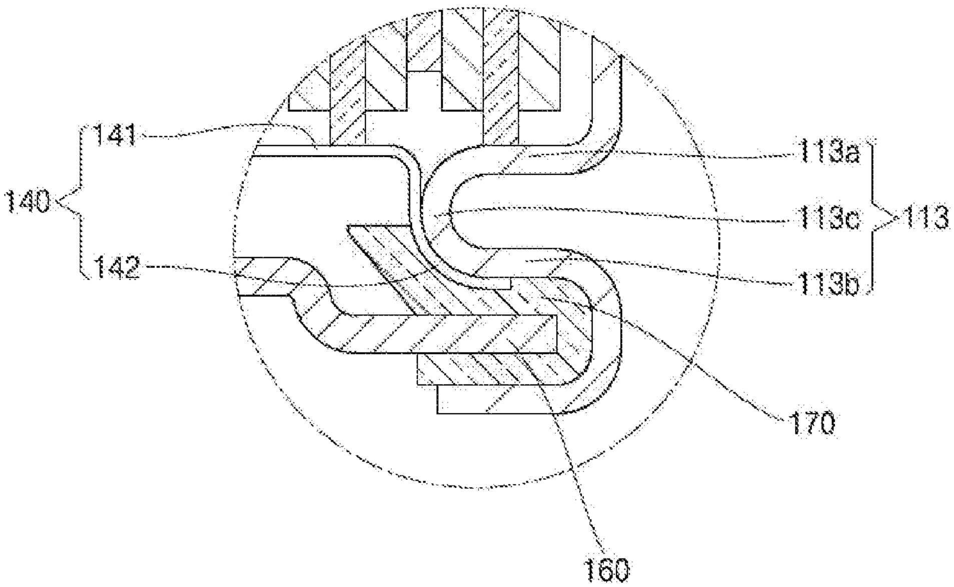
FIG. 5 is an enlarged cross-sectional view illustrating a portion of the cylindrical secondary battery shown in FIG. 2.

FIG. 1 is a perspective view illustrating a cylindrical secondary battery according to an embodiment of the present disclosure. FIG. 2 is a cross-sectional view of the cylindrical secondary battery shown in FIG. 1. FIG. 3 is a cut-away perspective view illustrating a portion of a secondary battery according to an embodiment of the present disclosure. FIGS. 4A and 4B are perspective views illustrating a welding region and a stress direction of a current collector plate in a secondary battery according to an embodiment of the present disclosure. FIG. 5 is an enlarged cross-sectional view illustrating a portion of the cylindrical secondary battery shown in FIG. 2.

As illustrated in FIGS. 1 to 3, the secondary battery 100 according to an embodiment of the present disclosure may include a cylindrical can 110, an electrode assembly 120 accommodated inside the cylindrical can 110, a rivet terminal (e.g., a first terminal) 150 coupled at a terminal hole in one end of the cylindrical can 110, a cap plate 160 sealing an opening at the other (e.g., the opposite) end of the cylindrical can 110, and a vent terminal 180 coupled at a vent hole (e.g., a vent opening) 164 a in the cap plate 160.

The cylindrical can 110 has a circular upper surface portion 111 and a side surface portion 112 extending a length (e.g., a constant length) downwardly from an edge (e.g., a periphery) of the upper surface portion 111. The upper surface portion 111 and the side surface portion 112 of the cylindrical can 110 may be integrally formed.

The circular upper surface portion 111 may have a flat circular plate shape and may have a terminal hole 111*a* penetrating (e.g., extending through) the center thereof. The rivet terminal 150 may be inserted into the terminal hole (e.g., a terminal opening) 111*a* in the upper surface portion 111. A first gasket 111*b* for sealing and electrical insulation may be interposed between the terminal hole 111*a* and the rivet terminal 150. The first gasket 111*b* may electrically separate the rivet terminal 150 and the cylindrical can 110 from each other by preventing the rivet terminal 150 and the cylindrical can 110 from contacting each other. The terminal hole 111*a* in the upper surface portion 111 of the cylindrical can 110 may be sealed by the first gasket 111*b*. The first gasket 111*b* may be made of a resin material, such as polyethylene (PE), polypropylene (PP), or polyethylene terephthalate (PET).

During the manufacturing process of the cylindrical secondary battery 100, the lower part of the cylindrical can 110 is open (or is opened). Therefore, during the manufacturing process, the electrode assembly 120 and the electrolyte may be inserted in the cylindrical secondary battery 100 through the open lower part of the cylindrical can 110. In some embodiments, the electrode assembly 120 may be inserted into the cylindrical can 110 in a state in which the open lower part thereof faces upwardly (e.g., upwardly in a gravitational direction). After the electrode assembly 120 is inserted into the cylindrical can 110, the cap plate 160 is coupled to the open lower end. In addition, after the electrolyte is inserted into the cylindrical can 110 through the vent hole 164*a* in the cap plate 160, the cap plate 160 may seal the inside of the cylindrical can 110 by coupling the vent terminal 180 to the vent hole 164*a*. The electrolyte enables movement of lithium ions between the positive electrode plate 121 and the negative electrode plate 122 forming the electrode assembly 120. The electrolyte may be a non-aqueous organic electrolyte solution that is a mixture of a lithium salt and a high-purity organic solvent. In addition, the electrolyte may be a polymer using a polymer electrolyte or a solid electrolyte, but the type of electrolyte is not limited thereto.

The cylindrical can 110 may be made of steel, a steel alloy, aluminum, an aluminum alloy, or an equivalent thereof, but the material is not limited thereto. The cylindrical can 110 may have an inwardly recessed beading part 113 formed on an upper portion of the cap plate 160 to prevent the electrode assembly 120 from escaping to the outside, and a crimping part 114 may be formed at a lower portion of the cap plate 160.

After the electrode assembly 120 is inserted through the open lower end of the cylindrical can 110, the beading part 113 is formed to prevent the electrode assembly 120 from separating from the cylindrical can 110. The beading part 113 has an upper flat part 113*a* and a lower flat part 113*b*, which are substantially parallel to the upper surface portion 111, and a connecting part 113*c* that connects (e.g., extends between) the upper flat part 113*a* and the lower flat part 113*b* to each other. The outer surfaces of the upper flat part 113*a* and the lower flat part 113*b* may face each other. In some embodiments, the outer surfaces may be outer surfaces of the cylindrical can 110.

An edge of the lower surface of the electrode assembly 120 may be seated on the upper flat part 113*a* of the beading part 113. That is, the edge of the lower surface of the electrode assembly 120 may contact the upper surface of the upper flat part 113*a* of the beading part 113.

The electrode assembly 120 includes a positive electrode plate 121 coated with a positive electrode active material, a negative electrode plate 122 coated with a negative electrode active material, and a separator 123 interposed between the positive electrode plate 121 and the negative electrode plate 122 to prevent a short circuit therebetween while allowing the movement of lithium ions therebetween. After the positive electrode plate 121, the negative electrode plate 122, and the separator 123 are stacked, the electrode assembly 120 is wound from the winding end to have a substantially cylindrical shape. In addition, in the electrode assembly 120, a positive electrode uncoated portion to which a positive electrode active material is not applied may protrude from the positive electrode plate 121 in an upwardly direction, and a negative electrode uncoated portion to which a negative electrode active material is not applied may protrude downwardly from the negative electrode plate 122.

The positive electrode plate 121 has a positive electrode active material made of a transition metal oxide coated on at least one surface of a positive electrode current collector plate, which is a plate-shaped metal foil made of aluminum (Al). In addition, the positive electrode plate 121 may have the positive electrode uncoated portion without a positive electrode active material coated on an upper portion thereof. The positive electrode uncoated portion may protrude upwardly from the electrode assembly 120. For example, the positive electrode uncoated portion of the positive electrode plate 121 may protrude more upwardly than (e.g., may protrude above) the negative electrode plate 122 and the separator 123.

The negative electrode plate 122 has a negative electrode active material, such as graphite or carbon, coated on at least one surface of a negative electrode current collector plate, which is a plate-shaped metal foil made of copper (Cu) or nickel (Ni). In addition, the negative electrode plate 122 may have the negative electrode uncoated portion without a negative electrode active material coated on an upper portion thereof. The negative electrode uncoated portion may protrude downwardly from the electrode assembly 120. For example, the negative electrode uncoated portion of the negative electrode plate 122 may protrude more downwardly than (e.g., may protrude below) the positive electrode plate 121 and the separator 123.

The separator 123 may be polyethylene (PE) or polypropylene (PP) but is not limited thereto in the present disclosure. The separator may prevent an electrical short between the positive electrode plate 121 and the negative electrode plate 122 while allowing the movement of lithium ions.

The positive electrode current collector plate 130 may be a circular metal plate shaped to correspond to the upper surface of the electrode assembly 120. A plane (or planar) size of the positive electrode current collector plate 130 may be equal to or smaller than a size of an upper surface of the electrode assembly 120. The positive electrode current collector plate 130 may include aluminum, an aluminum alloy, nickel, a nickel alloy, copper, or a copper alloy. The positive electrode current collector plate 130 may be fixed and electrically connected to the positive electrode plate 121 exposed on the upper side of the electrode assembly 120 by welding in a state in which the lower surface thereof is in contact with the upper surface of the electrode assembly 120. The positive electrode current collector plate 130 may be fixed and electrically connected to the rivet terminal 150 by welding in a state in which the upper surface thereof is in contact with the lower surface of the rivet terminal 150. The positive electrode current collector plate 130 acts as a passage for current flow between the positive electrode plate 121 of the electrode assembly 120 and the rivet terminal 150.

The positive electrode current collector plate 130 includes a first body 131 and a first electrode welding portion 132.

The first body 131 may be provided in a substantially disc shape.

The first electrode welding portion 132 is partitioned inside the first body 131 by a first slit 135 and is welded to the electrode assembly 120.

The first electrode welding portion 132 is separated from the central region of the first body 131 of the positive electrode current collector plate 130 by the first slit 135 to be movable. Here, the edge of the first body 131 and the first electrode welding portion 132 are maintained at a connected state. In addition, the electrode assembly 120 is welded to the inside of the first electrode welding portion 132 partitioned by the first slit 135.

The first slit 135 may include a plurality of slits, which are arranged at a certain angle with respect to the center of the positive electrode current collector plate 130. In one embodiment, the first slit 135 may include an even number of slits, which are symmetrically arranged with respect to the center of the positive electrode current collector plate 130.

The first electrode welding portion 132 may include a first cantilever 133, a first center portion 134, and the first slit 135.

The first cantilever 133 may be provided in a form in which one end is fixed to the circumference of the first body 131 and the other end extending in the inward direction is free (e.g., is not connected to the first body 131). In some embodiments, the shape of the first cantilever 133 may include a horseshoe shape in which one end has a relatively small width and the other end has a relatively large width. In addition, a plurality of positive electrode plates 121 may be welded along the length direction of the first cantilever 133. In some embodiments, a welding region (e.g., by a laser beam) may be provided along the longitudinal direction of the first cantilever 133. In some embodiments, the first cantilever 133 may include a plurality of first cantilevers, which are arranged outside the first center portion 134 at a certain angle. In some embodiments, the first cantilever 133 may include an even number of first cantilevers, which are symmetrically arranged outside the first center portion 134.

The first center portion 134 may be provided substantially at the center of the first body 131. The rivet terminal 150 of the cylindrical can 110 may be welded to the first center portion 134. In some embodiments, the first center portion 134 may be provided with (or may be) a welding region (e.g., by resistance welding or ultrasonic welding).

The first slit 135 may be provided between the first body 131, the first cantilever 133, and the first center portion 134. In some embodiments, the shape of the first slit 135 may include a substantially C shape or U shape. In some embodiments, the first slit 135 may be provided along the circumference of the first cantilever 133 or along the circumference of the first center portion 134. In some embodiments, the plurality of first slits 135 may be provided by removing a portion of the first body 131 by a laser beam, a cutter, or a punch.

The negative electrode current collector plate 140 may include a circular planar portion 141 corresponding to the lower surface of the electrode assembly 120 and an extending portion 142 extending downwardly from the edge (e.g., the periphery) of the flat portion 141. The upper surface of the planar portion 141 may be in contact with the lower surface of the electrode assembly 120. The upper surface of the negative electrode current collector plate 140 may be fixed and electrically connected to the negative electrode plate 122 exposed to the lower portion of the electrode assembly 120 by welding in a state of being in contact with the lower surface of the electrode assembly 120.

The extending portion 142 may include a plurality of extending portions spaced apart from each other along the edge (e.g., the periphery) of the planar portion 141. Referring to FIG. 5, an enlarged cross-sectional view is shown illustrating a bottom portion of the cylindrical secondary battery 100, according to an embodiment, in a state in which the negative electrode current collector plate 140 is seated on the lower flat part 113*b* of the beading part 113 after the beading part 113 of the cylindrical can 110 is formed. As shown in FIG. 5, the extending portion 142 has, in one embodiment, four extending portions symmetrically arranged with each other and with respect to the planar portion 141, but the extending portion 142 is not limited thereto in the present disclosure. The extending portion 142 may be bent downwardly from the edge of the planar portion 141 to extend therefrom. In addition, the extending portion 142 may contact the connecting part 113*c* of the beading part 113 and the inner surface of the lower flat part 113*b*. In some embodiments, the inner surface may be an inner surface of the cylindrical can 110. An end of the extending portion 142 may be located below the lower flat part 113*b* of the beading part 113. The extending portion 142 may be fixed and electrically connected to the cylindrical can 110 by being welded in a state of being in contact with the inner surface of the lower flat part 113*b* of the beading part 113. Therefore, the negative electrode current collector plate 140 acts as a current flow path between the negative electrode plate 122 and the cylindrical can 110 of the electrode assembly 120.

As shown in FIG. 5, the welding of the extending portion 142 and the beading part 113 may be performed in the direction of the extending portion 142, before the crimping part 114 of the cylindrical can 110 is formed, in a state in which the negative electrode current collector plate 140 is seated on the lower part of the beading part 113. In other embodiments, however, the extending portion 142 and the beading part 113 may be welded to the extending portion 142 through the beading part 113 from the outside of the cylindrical can 110 after sealing the cylindrical can 110. To prevent damage to the second gasket 170 due to welding, the second gasket 170 may include a groove in a region corresponding to the welded portion.

The rivet terminal 150 may be inserted into the terminal hole 111*a* in the upper surface portion 111 of the cylindrical can 110 and may be electrically connected to the positive electrode current collector plate 130. The rivet terminal 150 may be made of the same or similar material as the positive electrode current collector plate 130 and the positive electrode plate 121. The rivet terminal 150 has a head part 150*a* exposed upwardly from the cylindrical can 110 and a fastening part 150*b* welded and coupled to the first center portion 134 provided in the positive electrode current collector plate 130 through the terminal hole 111*a* to be located inside the cylindrical can 110. The rivet terminal 150 may be coupled to the terminal hole 111*a* of the upper surface portion 111 of the cylindrical can 110 from the bottom to the top, and then the head part 150*a* may be compressed and deformed (compression molded) by a processing method, such as press or spinning, to then be in close contact with the upper surface portion 111. Here, the first gasket 111*b* may be interposed between the rivet terminal 150 and the terminal hole 111*a* to electrically insulate the rivet terminal 150 and the cylindrical can 110 and seal the same. The rivet terminal 150 may be electrically connected to the positive electrode plate 121 of the electrode assembly 120 through the first center portion 134 of the first body 131 provided in the positive electrode current collector plate 130.

The cap plate 160 is a circular metal plate and may be coupled to the lower end of the cylindrical can 110. The cap plate 160 may be coupled to the lower end of the cylindrical can 110 in a state in which the second gasket 170 is interposed between the cylindrical can 110 and the cap plate 160, thereby preventing the cap plate 160 from being electrical connected to the cylindrical can 110. The cap plate 160 is not electrically connected to the negative electrode and the positive electrode of the electrode assembly 120 and, thus, may have no separate electrical polarity.

The cap plate 160 may be fixed by forming the crimping part 114 at the lower end of the cylindrical can 110 in a state in which the edge of the cap plate 160 is seated under the lower flat part 113*b* of the beading part 113 of the cylindrical can 110. The cap plate 160 may be seated on the beading part 113 in a state in which the open bottom portion of the cylindrical can 110 faces upwardly.

The cap plate 160 may be seated in a state in which the second gasket 170 is interposed under the lower flat part 113*b* of the cylindrical can 110. Thereafter, the crimping part 114 of the cylindrical can 110 may be bent toward the inside of the cap plate 160 to press the second gasket 170 such that the cap plate 160 and the cylindrical can 110 are coupled to each other. Because the end of the negative electrode current collector plate 140 is located on the lower flat part 113*b* of the beading part 113, sealing of the cap plate 160 and the cylindrical can 110 may be more easily performed in a state in which the second gasket 170 is interposed therebetween. For example, when the end of the negative electrode current collector plate 123*a* extends beyond the lower flat part 113*b* of the beading part 113, the end of the negative electrode current collector plate 140 may be cracked or broken if the second gasket 170 presses the crimping part 114 in the process of sealing the cap plate 160 and the cylindrical can 110. Therefore, sealing between the cap plate 160 and the cylindrical can 110 may be relatively difficult.

The cap plate 160 may include at least one protruding portion 161 protruding downwardly. As an example, the protruding portion 161 of the cap plate 160 may be spaced apart from the center and may protrude downwardly therefrom to have a ring shape on a plane. As another example, the protruding portion 161 of the cap plate 160 may protrude downwardly to have a plurality of patterns. By including the protruding portion 161, the cap plate 160 may better support an internal pressure in the cylindrical can 110. In addition, the lower surface of the protruding portion 161 of the cap plate 160 may be positioned higher than the lower surface of the crimping part 114 of the cylindrical can 110. For example, the crimping part 114 of the cylindrical can 110 may protrude further downwardly than the protruding portion 161 of the cap plate 160. Therefore, when the cylindrical secondary battery 100 is placed on a flat surface, the crimping part 114 of the cylindrical can 110 may be in contact with the surface while the protruding portion 161 of the cap plate 160 may be spaced apart from the surface. In addition, because the crimping part 114 of the cylindrical can 110 protrudes more downwardly than the protruding portion 161 of the cap plate 160, even if the cap plate 160 expands due to the internal pressure of the cylindrical can 110, the cap plate 16 may not contact the flat surface. Therefore, the cylindrical secondary battery 100 maintains its overall height even when the internal pressure of the cylindrical can 110 increases.

In addition, a notch 162 is formed in the cap plate 160 so that the cap plate 160 opens (e.g., bursts) at a reference pressure. When the internal pressure of the cylindrical can 110 exceeds the reference (e.g., a breaking or bursting) pressure, the notch 162 may burst to prevent the cylindrical secondary battery 100 from exploding. For example, when excessive internal pressure is generated inside the cylindrical can 110, the notch 162 bursts so that the excessive internal pressure can be discharged (e.g., controllably discharged). The notch 162 in the cap plate 160 may be spaced apart from the center of the cap plate 160 and may have a ring shape in a plan view. In another embodiment, the notch 162 may be formed to have multiple patterns, and the shape of the notch 162 is not limited in the present disclosure.

In addition, the notch 162 may be spaced apart from the protruding portion 161. In one embodiment, the notch 162 may be provided in a concave portion 163 of the cap plate 160 that is concavely formed in the direction of (e.g., toward) the cylindrical can 110 with respect to the protruding portion 161. The cap plate 160 has unevenness (e.g., has a corrugated shape) due the concave portion 163 and the protruding portion 161 and, thus, can better withstand the internal pressure even if the internal pressure of the cylindrical can 110 increases.

In addition, the cap plate 160 has a vent hole 164*a* through which electrolyte is injected. The electrode assembly 120 is inserted into the cylindrical can 110 in a state in which the open lower part of the cylindrical can 110 faces upwardly, and an electrolyte is injected through the vent hole 164*a* after the cap plate 160 is coupled to the open lower end of the cylindrical can 110. After the electrolyte injection is completed, the inside of the cylindrical can 110 is sealed by inserting the vent terminal 180 into the vent hole 164*a* (e.g., is inserted from the bottom toward the top). A third gasket 164*b* may be interposed between the vent hole 164*a* and the vent terminal 180 to bring the vent hole 164*a* and the vent terminal 180 into close contact with each other. The third gasket 164*b* may be made of a resin material, such as polyethylene (PE), polypropylene (PP), or polyethylene terephthalate (PET), to pressurize and seal the vent hole 164*a* and the vent terminal 180 and may prevent the vent terminal 180 from being separated from the vent hole 164*a*.

The second gasket 170 may be made of a resin material, such as polyethylene (PE), polypropylene (PP), or polyethylene terephthalate (PET) to pressurize and seal a portion between the cylindrical can 110 and the cap plate 160 and may prevent the cap plate 160 from being separated from the cylindrical can 110.

Because the cylindrical secondary battery 100 has both a negative electrode and a positive electrode provided on the upper surface thereof, a plurality of cylindrical secondary batteries 100 have only to be connected at the upper surfaces thereof when electrically connecting a plurality of cylindrical secondary batteries 100 through a bus bar, thereby simplifying a bus bar connection structure.

FIGS. 4A and 4B are perspective views illustrating a welding region and a stress direction of a current collector plate in a secondary battery according to an embodiment of the present disclosure. The positive electrode current collector plate 130 will be described as an example.

In the embodiment shown in FIG. 4A, the positive electrode current collector plate 130 includes a plurality of first cantilevers 133 and a first center portion 134, and a welding region may be provided at each of the plurality of first cantilevers 133 and one may be provided at first center portion 134. In some embodiments, the plurality of first cantilevers 133 may include welding regions along the longitudinal direction and, thus, may be fixed to the plurality of positive electrode plates 121 of the electrode assembly 120. In some embodiments, the first center portion 134 may have a welding region provided at the center of the first center portion 134 to be fixed to the rivet terminal of the cylindrical can 110.

In FIG. 4B, arrows indicate stress directions. In the embodiment shown in FIG. 4B, the first cantilevers 133 and the first center portion 134 of the positive electrode current collector plate 130 may move in opposite directions. For example, the first cantilevers 133 may move in a substantially downward direction, and the first center portion 134 may move in a substantially upward direction because both the first cantilevers 133 and the first center portion 134 have one end fixed along the circumference of the first body 131. For example, the first cantilevers 133 have one end fixed to the circumference of the first body 131, and the first center portion 134 has opposite regions fixed to the circumference of the first body 131 so that the first cantilevers 133 and the first center portion 134 may move in opposite directions. Thus, the movement of the first cantilevers 133 and the movement of the first center portion 134 do not interfere with each other. Therefore, a separating phenomenon of the welding regions at the first cantilevers 133 and the first center portion 134 are less likely to occur. The negative electrode current collector plate 140 is designed in the same way as the positive electrode current collector plate 130 and can perform the same operation.

As described above, embodiments of the present disclosure provide a secondary battery capable of preventing separation of a welding region between an electrode assembly and a current collector plate or separation of a welding region between a current collector plate and a can when vibration or impact is applied thereto.

While the foregoing embodiments have been described to practice the secondary battery according to the present disclosure, it should be understood that the embodiments described herein should be considered in a descriptive sense and not for purposes of limitation, and various changes in form and details may be made therein without departing from the spirit and scope of the present disclosure as defined by the following claims and their equivalents.

What is claimed is:

1. A secondary battery comprising:
an electrode assembly;
a case accommodating the electrode assembly;
a cap plate sealing the case; and
a current collector plate welded between the electrode assembly and the case or between the electrode assembly and the cap plate, the current collector plate having a slit therein forming an electrode welding portion partitioned by the slit, the electrode assembly being welded to the electrode welding portion of the current collector plate,
wherein the electrode welding portion comprises a plurality of cantilevers and a center portion, and
wherein the cantilever is coupled to the electrode assembly.

2. The secondary battery of claim 1, wherein the slit is C-shaped or U-shaped.

3. The secondary battery of claim 1, wherein the current collector plate has a disc-shaped body, and wherein the electrode welding portion is partitioned inside the body by the slit.

4. The secondary battery of claim 3, wherein the electrode welding portion is separated from a central region of the body of the current collector plate by the slit.

5. The secondary battery of claim 3, wherein a periphery of the body and the electrode welding portion are physically connected.

6. The secondary battery of claim 1, wherein the current collector plate has a plurality of the slits, and wherein the slits are arranged at an angle with respect to a center of the current collector plate.

7. The secondary battery of claim 6, wherein the current collector plate has an even number of the slits, and wherein the slits are symmetrically arranged with respect to the center of the current collector plate.

8. The secondary battery of claim 1, further comprising a first terminal, wherein the case has an opening sized to accommodate the electrode assembly, wherein the case has a hole in a surface facing the opening, and wherein the first terminal is electrically coupled to the current collector plate through the hole in the case.

9. The secondary battery of claim 8, wherein the first terminal has a head part outside the case and a fastening part welded and coupled to a central region of the current collector plate through the hole in the case.

10. The secondary battery of claim 1, wherein the cantilevers and the center portion are configured to move in opposite directions.

11. The secondary battery of claim 10, wherein the cantilevers move downward, and wherein the center portion is configured to move upward.

12. The secondary battery of claim 1, wherein the current collector plate is a positive electrode.

13. The secondary battery of claim 1, wherein the case comprises an upper surface portion including a terminal hole, and a side surface portion, wherein a terminal is inserted into the terminal hole, and wherein the center portion is coupled to the terminal.

14. The secondary battery of claim 1, wherein the cantilever comprises a welding region, and wherein the welding region extends in a longitudinal direction of the cantilever.

15. The secondary battery of claim 1, wherein a width of the cantilever varies while extending in a longitudinal direction of the cantilever.

16. The secondary battery of claim 3, wherein the cantilever and an edge of the body are connected.

17. The secondary battery of claim 1, wherein an area of each cantilever is greater than an area of the center portion.

18. The secondary battery of claim 1, wherein the slit is formed by a straight line and a curve.

* * * * *